US012719984B2

(12) United States Patent
Mahajan et al.

(10) Patent No.: US 12,719,984 B2
(45) Date of Patent: Aug. 25, 2026

(54) SYSTEM AND METHOD FOR PERFORMING DUAL CHANNEL COMMUNICATIONS

(71) Applicant: Bank of America Corporation, Charlotte, NC (US)

(72) Inventors: Nipun Mahajan, Lawrenceville, NJ (US); Yogesh Raghuvanshi, Pennington, NJ (US); Robert E Lutzkow, Phillipsburg, NJ (US); Leigh E Pike, Danville, CA (US)

(73) Assignee: Bank of America Corporation, Charlotte, NC (US)

(*) Notice: Subject to any disclaimer, the term of this patent is extended or adjusted under 35 U.S.C. 154(b) by 144 days.

(21) Appl. No.: 18/907,291

(22) Filed: Oct. 4, 2024

(65) Prior Publication Data

US 2026/0101001 A1 Apr. 9, 2026

(51) Int. Cl.
*H04M 3/493* (2006.01)
*G06F 40/20* (2020.01)

(52) U.S. Cl.
CPC ............ *H04M 3/493* (2013.01); *G06F 40/20* (2020.01); *H04M 2203/25* (2013.01); *H04M 2203/6009* (2013.01)

(58) Field of Classification Search
CPC ............. H04M 3/493; H04M 2203/25; H04M 2203/6009; H04M 3/4936; H04M 1/2535; G06F 40/20; G10L 25/78
See application file for complete search history.

(56) References Cited

U.S. PATENT DOCUMENTS

| | | | | |
|---|---|---|---|---|
| 5,483,579 | A | 1/1996 | Stogel | |
| 6,744,860 | B1 | 6/2004 | Schrage | |
| 6,804,346 | B1 | 10/2004 | Mewhinney | |
| 6,882,973 | B1 | 4/2005 | Pickering | |
| 7,426,268 | B2 | 9/2008 | Walker et al. | |
| 7,606,718 | B2 | 10/2009 | Cloran | |
| 7,657,022 | B2 | 2/2010 | Anderson | |
| 7,936,861 | B2 | 5/2011 | Knott et al. | |
| 8,358,772 | B2 | 1/2013 | Timpson | |
| 8,447,690 | B2 | 5/2013 | Rock et al. | |
| 8,515,026 | B2 | 8/2013 | McAllister | |
| 8,917,827 | B2 | 12/2014 | Gupta et al. | |
| 9,071,947 | B1 | 6/2015 | Figa | |
| 9,635,177 | B1 | 4/2017 | Hoffberg | |
| 9,680,998 | B2 | 6/2017 | Pickford | |
| 9,721,565 | B2 | 8/2017 | Perlmutter | |
| 10,110,741 | B1 | 10/2018 | Cohen et al. | |
| 10,250,749 | B1 * | 4/2019 | Boone ................ | H04M 3/4935 |

(Continued)

*Primary Examiner* — Yosef K Laekemariam

(57) ABSTRACT

In response to detecting a telephone call from a user device of a user at an interactive voice response (IVR) processor, an intent of the user is determined. Upon determining that the intent of the user is configured for an assisted interaction using a dual connection with the user device including a telephone connection and a persistent data connection, the persistent data connection is setup with the user device and the assisted interaction is performed with the user device. Performing the assisted interaction includes receiving an input message from the user device and, in response, transmitting a first response message to the user device over the telephone connection and, in conjunction, transmitting a second response message to the user device over the data connection.

20 Claims, 2 Drawing Sheets

(56) References Cited

U.S. PATENT DOCUMENTS

| | | | | |
|---|---|---|---|---|
| 11,153,425 | B2 | 10/2021 | Dhawan et al. | |
| 2005/0002507 | A1 | 1/2005 | Timmins et al. | |
| 2012/0045043 | A1* | 2/2012 | Timpson | H04M 3/5166<br>379/88.04 |
| 2017/0070548 | A1* | 3/2017 | Davis | H04M 3/5191 |
| 2017/0302797 | A1 | 10/2017 | Waalkes et al. | |

* cited by examiner

SYSTEM AND METHOD FOR PERFORMING DUAL CHANNEL COMMUNICATIONS

TECHNICAL FIELD

The present disclosure relates generally to network communication, and more specifically to a system and method for performing data interactions in a computing system.

BACKGROUND

In conventional systems, an IT infrastructure of the entity generally provides a user several methods or channels to perform data interactions. For example, the IT infrastructure of the entity may provide an interactive voice response (IVR) system that is an automated telephone system technology that enables callers to receive or provide information, or make requests using voice or menu inputs, without speaking to a live agent. Conventional IVR systems suffer from several limitations that often cause computing resources of the IVR systems to be overloaded causing the computing resources to be exhausted resulting in slower response times and overall performance degradation. In some cases, the IT infrastructure of an entity may provide a software application (e.g., web application, mobile application etc.) that allows a user to perform data interactions. However, the software applications suffer from similar limitations that cause slower server response times and the servers to get overloaded.

SUMMARY

The system and method implemented by the system as disclosed in the present disclosure provide technical solutions to the technical problems discussed above by providing improved techniques for performing data interactions in a computing network.

For example, the disclosed system and methods provide the practical application of performing an assisted interaction for performing a requested data interaction, wherein the assisted interaction is performed using a dual communication channel with a user device that improves response times and overall processing performance of the user device, an IVR system and backend computing systems processing the data interaction.

Conventional IVR systems suffer from several limitations that often cause computing resources of the IVR systems to be overloaded causing the computing resources to be exhausted resulting in slower response times and overall performance degradation. For example, IVR systems have complex menu structures including IVR menus that are convoluted and difficult to navigate for users, especially when there are multiple levels and options. This can cause confusion to a calling user who may spend large amounts of time navigating the complex IVR menus to determine the right menu option(s) that serves the user's intent. This means each calling user occupies a large amount of computing resources and bandwidth of the IVR system. Additionally, IVR systems possess limited natural language understanding and often struggle with understanding complex or nuanced language, leading to incorrect determinations of user intent which in turn may lead to presentation of menu items that are irrelevant to the actual intent of the user. This means that the IVR system uses increased computing resources to process the user's voice inputs and interpret user intent. Further, it takes the user much longer to establish user intent with the IVR system and eventually be presented the menu options that align with the user intent. All these limitations of the IVR system put increased load on the computing resources of the IVR system, especially when a large number of users call into the IVR system simultaneously that may eventually lead to computing system overload in the IVR system. Continued overload of the IVR system may even lead to system failure.

Additionally, in conventional systems, software applications used to perform data interactions also suffer from similar downsides like the IVR systems. For example, software applications typically include a complex menu structure (having several menus and sub-menus) and hundreds of user interface (UI) screens that cause even computer savvy users to take large amounts of time to navigate and determine the correct menu options and UI screens that serve the user's intent. This means that each user uses considerable amount of computing resources associated with a server that hosts the software application to navigate irrelevant menu options and UI screens. This issue worsens when large numbers of users simultaneously access the server hosting the software application, often leading to server overload and slow server response times. An overload of the server may lead to a hung system causing the server to be out of service. The server overload issue further worsens when users who were unable to perform a data interaction using the IVR system (e.g., because of long wait times, unable to navigate complex IVR menus, and/or slow IVR response times) resort to using the software application to perform the same data interactions.

Embodiments of the present disclosure describe techniques to help a user to perform data interactions quickly and efficiently. For example, as described in embodiments of the present disclosure, the discussed techniques include performing an assisted interaction to help a user perform a requested data interaction, wherein performing the assisted interaction includes establishing and maintaining a persistent telephone connection and a persistent data connection with the user device of the user, and communicating over the telephone connection as well as the data connection, in conjunction, to walk the user through a workflow for performing a requested data interaction. The workflow includes a sequence of step-wise operations, wherein each step of the workflow includes one or more UI screens of a software application (where the user is to perform an operation) that are to be indicated to the user via the data connection and instructions that are to be provided to the user via voice prompts over the telephone connection. By walking the user through a step-wise workflow and assisting the user at each step of the workflow by providing specific instructions to perform one or more operations at a UI screen, the disclosed system and method significantly speeds up data interactions performed by users as the user no more needs to navigate through complex and inefficient menu structures associated with the IVR system and/or the software application. This saves computing resources at the IVR processor as well as at backend computing nodes servicing the software application. For example, the cumulative saving of computing resources at the IVR processor and at the backend computing nodes servicing the software application over a plurality of data interactions performed by a plurality of users avoids computing resource overload at these systems, thus improving response times and avoiding failures of these computing systems.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
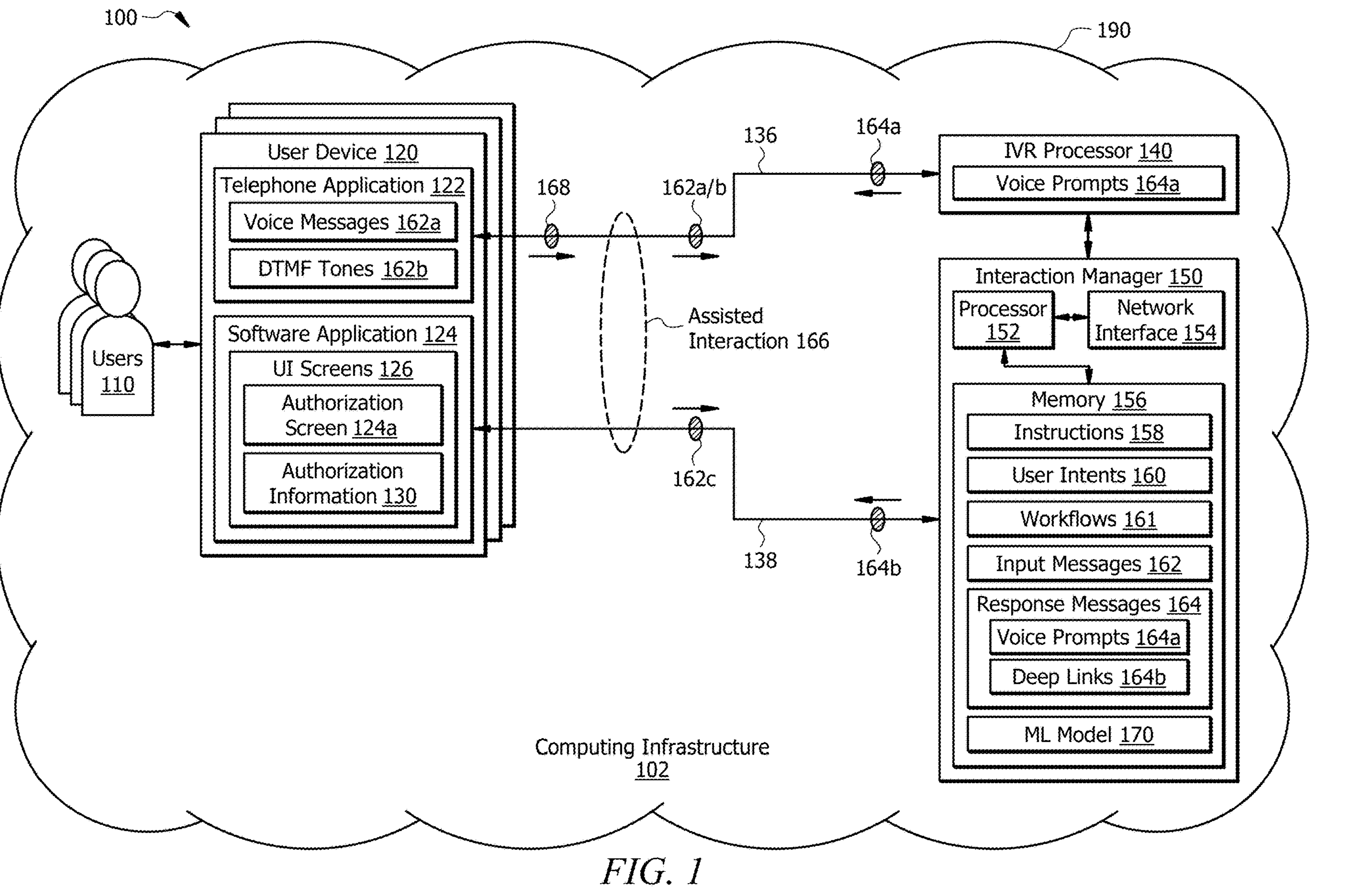
FIG. 1 is a schematic diagram of a system, in accordance with certain aspects of the present disclosure.

FIG. 1 is a schematic diagram of a system 100, in accordance with certain aspects of the present disclosure. As shown, system 100 includes a plurality of user devices 120, an Interactive Voice Response (IVR) processor 140, and an interaction manager 150 connected to a network 190. In one or more embodiments, one or more user devices 120, the IVR processor 140, and/or the interaction manager 150 may be part of a computing infrastructure 102, wherein the computing infrastructure includes a plurality of computing nodes (not shown) connected to the network 190. In this context, a user device 120, the IVR processor 140, and the interaction manager 150 may be run by and/or implemented by one or more computing nodes of the computing infrastructure 102. The computing infrastructure may include a plurality of hardware and software components. The hardware components may include, but are not limited to, computing nodes such as desktop computers, smartphones, tablet computers, laptop computers, servers and data centers, mainframe computers, virtual reality (VR) headsets, augmented reality (AR) glasses and other hardware devices such as printers, routers, hubs, switches, and memory all connected to the network 190. Software components may include software applications that are run by one or more of the computing nodes including, but not limited to, operating systems, user interface applications, third party software, database management software, service management software, mainframe software, metaverse software, AI tools and other customized software programs implementing particular functionalities (e.g., functionalities associated with IVR processor 140, interaction manager 150, user device 120 etc.). For example, software code relating to one or more software applications may be stored in a memory device and one or more processors belonging to one or more computing nodes of the computing infrastructure 102 may execute the software code to implement respective functionalities. In one embodiment, at least a portion of the computing infrastructure 102 may be representative of an Information Technology (IT) infrastructure of an organization. For example, the IVR processor 140 and the interaction manager 150 may be computing nodes that are part of the IT infrastructure of an organization. Additionally, or alternatively, one or more of the user devices 120 may be part of the IT infrastructure of the organization. In one embodiment, one or more user devices 120 may be external to this IT infrastructure.

Each user device 120 may be operated by a user 110. For example, a user device 120 may provide a user interface using which a user 110 may perform data interactions within the computing infrastructure 102. In one or more embodiments, a user device 120 may refer to a personal computing node such as a laptop computer, desktop computer, tablet computer, smart phone, smart watch etc.

One or more computing nodes of the computing infrastructure 102 including one or more of the user devices 120, IVR processor 140 or interaction manager 150 may be representative of a computing system which hosts software applications that may be installed and run locally or may be used to access software applications running on a server. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality as described below. In certain embodiments, one or more of the computing nodes 104 may run a thin client software application where the processing is directed by the thin client but largely performed by a central entity such as a server (not shown).

Network 190, in general, may be a wide area network (WAN), a personal area network (PAN), a cellular network, or any other technology that allows devices to communicate electronically with other devices. In one or more embodiments, network 190 may be the Internet.

In conventional systems, a user 110 may perform several data interactions within the computing infrastructure 102. The data interactions may include, but are not limited to, update (e.g., add, delete, put one hold) user memberships/subscriptions, review previous data interactions performed in relation to the user's memberships/subscriptions, updating personal information (e.g., residential address, social security number, phone number etc.), update user preferences (e.g., configuring user alerts), transfer data objects from data files of the user, receive data objects into data files of the user. For example, a user 110 may operate a user device 120 to connect with one or more computing devices of the computing infrastructure 102 and perform a particular data interaction.

In conventional systems, an entity that owns and/or operates at least a portion of the computing infrastructure (e.g., a portion that represents an IT infrastructure of the entity) generally provides a user 110 several methods or channels to perform data interactions. For example, the IT infrastructure of an entity may provide an IVR system (e.g., IVR processor 140) that is an automated telephone system technology that enables callers to receive or provide information, or make requests using voice or menu inputs, without speaking to a live agent. An IVR system is generally configured with pre-recorded messages that are delivered to the caller as voice prompts and supports a dual-tone multi-frequency (DTMF) interface that allows a caller to provide inputs by pressing keys on a user's telephone device. In some cases, the IVR system may also be configured to receive voice inputs from a caller. Conventional IVR systems suffer from several limitations that often cause computing resources of the IVR systems to be overloaded causing the computing resources to be exhausted resulting in slower response times and overall performance degradation. For example, IVR systems have complex menu structures including IVR menus that are convoluted and difficult to navigate for users, especially when there are multiple levels and options. This can cause confusion to a calling user who may spend large amounts of time navigating the complex IVR menus to determine the right menu option(s) that serves the user's intent. This means each calling user occupies a large amount of computing resources of the IVR system. Additionally, IVR systems possess limited natural language understanding and often struggle with understanding complex or nuanced language, leading to incorrect determinations of user intent which in turn may lead to presentation of menu items that are irrelevant to the actual intent of the user. This means that the IVR system uses considerable computing resources to process the user's voice inputs and interpret user intent. Further, it takes the user much longer to establish user intent with the IVR system and eventually be presented the menu options that align with the user intent. All these limitations of the IVR system put considerable load on the computing resources of the IVR system, especially when a large number of users call into the IVR system simultaneously that may eventually lead to computing system overload in the IVR system. Continued overload of the IVR system may even lead to system failure.

In some cases, the IT infrastructure of an entity may provide a software application (e.g., web application, mobile application etc.) that allows a user 110 to perform data interactions. However, in conventional systems, the software applications suffer from similar downsides like the IVR systems. For example, software applications typically include a complex menu structure (having several menus and sub-menus) and hundreds of user interface (UI) screens that cause even computer savvy users to take large amounts of time to navigate and determine the correct menu options and UI screens that serve the user's intent. This means that each user uses considerable amount of computing resources associated with a server that hosts the software application to navigate irrelevant menu options and UI screens. This issue worsens when large numbers of users simultaneously access the server hosting the software application, often leading to server overload and slow server response times. An overload of the server may lead to a hung system causing the server to be out of service. The server overload issue further worsens when users who were unable to perform a data interaction using the IVR system (e.g., because of long wait times, unable to navigate complex IVR menus, and/or slow IVR response times) resort to using the software application to perform the same data interactions.

Embodiments of the present disclosure describe techniques to help a user 110 to perform data interactions quickly and efficiently with little user effort. For example, as described in embodiments of the present disclosure, the discussed techniques include performing an assisted interaction 166 to help a user 110 perform a requested data interaction, wherein performing the assisted interaction 116 includes establishing and maintaining a persistent telephone connection and a persistent data connection with the user device 120 of the user 110, and communicating over the telephone connection as well as the data connection, in conjunction, to walk the user 110 through a workflow 161 for performing a requested data interaction. The workflow 161 includes a sequence of step-wise operations, wherein each step of the workflow 161 includes one or more UI screens 126 of a software application 124 (where the user is to perform an operation) that are to be indicated to the user 110 via the data connection and instructions that are to be provided to the user via voice prompts **164*a* over the telephone connection. By walking the user 110 through a step-wise workflow 161 and assisting the user 110 at each step of the workflow 161 by providing specific instructions to perform one or more operations at a UI screen 126, the disclosed system and method significantly speeds up data interactions performed by users as the user no more needs to navigate through complex and inefficient menu structures associated with the IVR system (e.g., IVR processor 140) and the software application (e.g., software application 124). This saves computing resources at the IVR processor 140 as well as at computing nodes servicing the software application 124. The cumulative saving of computing resources at the IVR processor 140 and at the computing nodes servicing the software application 124** over a plurality of data interactions performed by a plurality of users avoids computing resource overload at these systems, thus improving response times and failures of these computing systems.

At least a portion of the computing infrastructure 102 (e.g., one or more computing nodes of the computing infrastructure 102) may implement an interaction manager 150 which may be configured to implement techniques for performing efficient data interactions in a computing network (e.g., computing infrastructure 102). The interaction manager 150 includes a processor 152, a memory 156, and a network interface 154. The interaction manager 150 may be configured as shown in FIG. 1 or in any other suitable configuration.

The processor 152 includes one or more processors operably coupled to the memory 156. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions 158 to implement the interaction manager 150. In this way, processor 152 may be a special-purpose computer designed to implement the functions disclosed herein. In one or more embodiments, the interaction manager 150 is implemented using logic units, FPGAs, ASICs, DSPs, or any other suitable hardware. The interaction manager 150 is configured to operate as described with reference to FIG. 2. For example, the processor 152 may be configured to perform at least a portion of method 200 as described with reference to FIG. 2.

The memory 156 includes a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may include a read-only memory (ROM), random-access memory (RAM), ternary content-addressable memory (TCAM), dynamic random-access memory (DRAM), and static random-access memory (SRAM).

The memory 156 is operable to store the instructions 158, user intents 160 of users 110 calling into the IVR processor 140, workflows 161 associated with the user intents 160, input messages 162 received from a user device 120, response messages 164 to be transmitted to the user device 120, machine learning (ML) model and any other data needed to performed operations of the interaction manager 150 as described in embodiments of the present disclosure. The instructions 158 may include any suitable set of instructions, logic, rules, or code operable to execute the interaction manager 150.

The network interface 154 is configured to enable wired and/or wireless communications. The network interface 154 is configured to communicate data between the interaction manager 150 and other devices, systems, or domains (e.g., IVR processor 140 user devices 120 etc.). For example, the network interface 154 may include a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that the IVR processor 140 and each user device 120 may be implemented like the interaction manager 150 shown in FIG. 1. For example, each of the IVR processor 140 and user device 120 may have a respective processor and a memory that stores data and instructions to perform a respective functionality of the IVR processor 140 and user device 120.

A user device 120 may be configured to run a plurality of software applications, wherein each software application allows a user 110 to perform a respective set of data interactions. For example, as shown in FIG. 1, the user device 120 may run a telephone application 122 that allows the user 110 to place telephone calls 168 to other users 110 and/or systems such as IVR processor 140. For example, the user 110 may use the telephone application 122 to place a telephone call 168 to the IVR processor 140 and establish a telephone connection 136 between the user device 120 and the IVR processor 140. In one embodiment, the telephone application 122 may provide a user interface having a keypad (e.g., displayed on a display) of the user device 120 using which the user 110 may dial a telephone number of the IVR processor 140. Once a telephone connection 136 is established between the user device 120 and the IVR processor 140, the user device 120 may transmit input messages 162 (shown as voice messages 162*a* and DTMF tones 162*b*) to the IVR processor 140 and receive response messages 164 (e.g., voice prompts 164*a*) from the IVR processor 140. For example, the telephone application 122 may allow the user 110 to provide voice messages 162*a* and DTMF tone 162*b* messages as input messages for transmission to the IVR processor 140. DTMF tones 162*b* refers to the sounds that a phone makes when a key is pressed on a keypad of the telephone application 122. When the IVR processor 140 supports a DTMF interface, input messages 162 may be provided by a user 110 using the DTMF tones 162*b*. For example, DTMF tones 162*b* allow the user 110 to select from menu options presented by the IVR processor 140 by pressing particular keys on the keypad of the telephone application 122.

As shown in FIG. 1, the user device 120 may additionally run a software application 124 that allows the user 110 to perform one or more data interactions associated with an entity associated with the software application 124. As shown, the software application 124 may be configured with a plurality of UI screens 126 that can be displayed on a display of the user device 120, wherein each UI screen 126 allows the user 110 to perform one or more specific operations. For example, a UI screen 126 may allow the user 110 to view information, select between multiple options, provide information using input fields, launch tasks using buttons, or a combination thereof. It may be noted that this is not an exhaustive list, and a skilled person may appreciate that a UI screen 126 may include any number and types of UI elements.

In one embodiment, when the user device 120 is a portable computing device such as a smartphone or a tablet computer, the telephone application 122 and the software application 124 may be mobile applications running on the user device 120. In alternative embodiments, when the user device 120 is a personal computer such as a laptop or a desktop computer, the telephone application 122 and the software application 124 may be web applications running on the user device 120. It may be noted that the telephone application may be configured to place a telephone call 168 to the IVR processor 140 using a conventional telephone network such as cellular network and/or over the internet using voice over internet protocol (VOIP) technology.

The IVR processor 140 is an automated telephone system that enables callers (e.g., users 110) to receive or provide information, or make requests using voice or menu inputs, without speaking to a live agent. The IVR processor 140 is configured to communicate with a user 110 by delivering pre-configured voice prompts 164*a* to a user device 120 of a user 110 over the telephone connection 136 with the user device 120. The voice prompts 164*a* may include pre-recorded voice prompts 164*a* (e.g., stored at the IVR processor 140) and/or voice prompts 164*a* generated by the interaction manager 150. The term "voice prompt" typically refers to a pre-recorded/pre-generated script that is played by the IVR processor 140. The IVR processor 140 may be configured to receive input messages 162 from the user 110 as voice messages 162*a* and/or DTMF tones 162*b*. In one embodiment, the IVR processor 140 may have a two-way connection with the interaction manager 150 that allows the IVR processor 140 to transmit data to the interaction manager 150 as well as receive data from the interaction manager 150.

In one or more embodiments, the interaction manager 150 may be configured to perform assisted interactions 166 to help users 110 perform a plurality of data interactions. Performing an assisted interaction 116 with a user 110 includes establishing and maintaining a persistent telephone connection 136 and a persistent data connection 138 with a user device 120 of the user 110 and communicating over the telephone connection 136 as well as the data connection 138, in conjunction, to walk the user 110 through a workflow 161 for performing a requested data interaction. In one embodiment, as described below, the telephone connection 136 and the data connection 138 are simultaneously active throughout the length of the assisted data interaction 166. The interaction manager 150 may be configured to store a plurality of user intents 160, wherein each user intent 160 indicates a particular data interaction that can be performed by a user 110. For example, data interactions that may be performed by a user 110 may include, but are not limited to, update (e.g., add, delete, put one hold) user memberships/subscriptions, review previous data interactions performed in relation to the user's memberships/subscriptions, updating personal information (e.g., residential address, social security number, phone number etc.), update user preferences (e.g., configuring user alerts), transfer data objects from data files of the user, receive data objects into data files of the user. For each user intent 160, the interaction manager 150 may store a workflow 161. Each workflow 161 includes a sequence of step-wise operations as part of performing an assisted interaction 166 to serve a respective user intent 160, wherein each step of the workflow 161 includes one or more UI screens 126 of a software application 124 (where the user is to perform an operation) that are to be indicated to the user 110 via a data connection 138 to a user device 120 and instructions that are to be provided to the user 110 via voice prompts 164*a* over a telephone connection 136 to the user device 120. In other words, a workflow 161 associated with a particular user intent 160 provides a sequence of operations that are to be performed to help a user 110 perform a data interaction indicated by the user intent 160. The term "deep link" is a type of link that sends users directly to a specific page in the software application 124.

As further described below, once a user intent 160 of a calling user 110 is determined, the interaction manager 150 may be configured to receive input messages 162 from the user device 120 of the user 110 (e.g., via the telephone connection 136 and/or the data connection 138) and determine one or more response messages 164 to be provided to the user device 120 based on a workflow 161 that is associated with the determined user intent 160 of the user 110. Each step of the workflow 161 is triggered by a particular input message 162.

In one or more embodiments, a user 110 desiring to perform a particular data interaction may use the telephone application 122 installed at a user device 120 of the user 110 to place a telephone call 168 to the IVR processor 140. The IVR processor 140 may receive the telephone call 168 and a telephone connection 136 is established between the IVR processor 140 and the user device 120. In one embodiment, in response to detecting that a telephone call 168 is received from the user device 120, the interaction manager 150 may be configured to command the IVR processor 140 to transmit a response message 164 to the user device 120 including a voice prompt 164*a* asking a user intent 160 of the user 110. In one embodiment, the interaction manager 150 may generate the voice prompt 164*a* and forward it to the IVR processor 140 for transmission to the user device 120. For example, the voice prompt 164*a* may include "Hello! How may I help you today". In one embodiment, the voice prompt 164*a* is transmitted to the user device 120 as a voice file (e.g., wav, mp3, mp4 etc.) that is played by the telephone application 122 at the user device 120. In response to receiving the voice prompt 164*a* from the IVR processor 140, the user 110 may provide an input message 162 including and/or indicating a user intent 160 of the user 110. In an example use case where the user 110 desires to temporarily block one of several memberships the user 110 has with an entity, the user 110 may provide an input message 162 in the form of a voice message 162*a* indicating the user intent 160. For example, the user 110 may announce "I would like to block a membership". Additionally, or alternatively, the user 110 may provide the input message 162 as DTMF tones 162*b*. For example, the voice prompt 164*a* transmitted by the IVR processor 140 may announce a menu with a plurality of menu options, wherein each menu option relates to a particular user intent 160 and is associated with a particular key. For example, the voice prompt 164*a* may announce "Please select from the following menu options—press 1 for viewing a membership, press 2 for blocking a membership, press 3 for updating information, or press 0 to speak to an agent". In response, the user 110 may press '2' on the keypad of the telephone application 122 to select the menu option "blocking a membership".

In response to receiving an input message 162 from the user device 120, the IVR processor 140 may be configured to forward the input message 162 to the interaction manager 150 which may be configured to interpret the input message 162 and determine one or more response messages 164 to be provided to the user device 120. For example, in response to receiving a voice message 162*a* (received at the IVR processor 140 from the user device 120) from the IVR processor 140, the interaction manager 150 may interpret the voice message 162*a* using natural language processing (NLP) to determine the user intent 160 of the user 110. Following the example use case introduced in the above paragraph, when the voice message 162*a* states "I would like to block a membership", the interaction manager 150 may use natural language processing to interpret the content of the voice message 162*a* and determine that the user intent 160 relates to temporarily blocking a user membership. In an alternative or additional embodiment, the IVR processor 140 may be configured to interpret the input message 162 received from the user device 120 and interpret the input message 162 to determine an intent of the user 110. For example, in response to receiving a DTMF tone 162*b* selecting a menu option associated with a particular user intent 160 (e.g., block a user membership), the IVR processor 140 may forward the user intent 160 associated with the selected menu option to the interaction manager 150.

Once the user intent 160 of the calling user 110 is determined, the interaction manager 150 may be configured to determine whether the user intent 160 is associated with a pre-configured workflow 161 of an assisted interaction 166 that can help the user 110 to perform the data interaction (e.g., block membership) relating to the determined user intent 160 of the user 110. In other words, the interaction manager 150 determines whether assisted interaction 166 may be used to help the user perform the data interaction (e.g., block membership) relating to the determined user intent 160 of the user 110. Once a preconfigured workflow 161 of an assisted interaction 166 associated to the determined user intent 160 is determined, the interaction manager 150 may be configured to initiate the assisted interaction 166 in accordance with the determined workflow 161. As part of initiating the assisted interaction 166 the interaction manager 150 establishes a persistent data connection 138 with the user device 120, wherein the persistent data connection 138 is configured to exchange data with the software application 124 at the user device 120. For example, the interaction manager 150 establishes a websocket with the user device 120. The term "websocket" refers to a communication protocol that allows a client (e.g., user device 120) and a server (e.g., interaction manager 150) to maintain a persistent, two-way connection. This connection enables real-time communication between the two endpoints, without the need to open multiple HTTP (Hypertext Transfer Protocol) connections. In one embodiment, once the persistent data connection 138 with the user device 120 is established, the interaction manager 150 maintains the data connection 138 along with the telephone connection 136 between the IVR processor 140 and the user device 120 for as long as the assisted interaction 166 is being performed.

In one embodiment, once the user intent 160 of the user 110 is determined and the workflow 161 associate with the user intent 160 is found, the interaction manager 150 may be configured to authorize an identity of the user 110 before initiating the assisted interaction 166 in accordance with the workflow 161. For example, as part of asking the user to authorize identity of the user 110, the interaction manager 150 may transmit to the user device a link (e.g., deep link) to an authorization screen 124*a* (e.g., a login page) which is a UI screen 126 of the software application 124 that the user 110 may use to provide authorization information 130 to prove the identity of the user 110. In conjunction with transmitting the link to the authorization screen 124*a*, the interaction manager 150 may generate a voice prompt 164*a* that asks the user 110 to use the link received at the user device 120 to provide authorization information 130. For example, the voice prompt 164*a* may state "Please use the authorization link received on your phone to login to your XYZ App", wherein XYZ refers to the software application 124. The interaction manager 150 forwards this voice prompt 164*a* to the IVR processor 140 for transmission to the user device 120 via the telephone connection 136 in conjunction with transmitting the link to the authorization screen 124*a*. At this point, the data connection 138 may not have been established. Thus, the interaction manager 150 may transmit the link of the authorization screen 126 using one or more of several methods including, but not limited to, text message, a notification associated with the software application, or via email to an email address associated with a phone number of the user device 120 used to place the telephone call 168. Upon receiving the link to the authorization screen 124*a*, the user 110 may select the received link to launch the software application 124 on the user device 120 and open the authorization screen 124*a*. The user 110 may provide authorization information 130 using the authorization screen which is transmitted as an input message 162 back to the interaction manager 150. For example, when the authorization screen 124*a* is a login page of the software application, authorization information may include, but is not limited to, a username and password or biometrics such as fingerprint and/or face ID. In one embodiment, as no persistent data connection 138 has been established at this point, the authorization information 130 is transmitted to the interaction manager 150 using traditional means such as an HTTP data packet or any other known means of communication.

Upon receiving the authorization information 130 from the user device 120, the interaction manager 150 may be configured to verify the identity of the user 110 based on the authorization information 130 and, upon successful verification, establish the persistent data connection 138 with the user device 120 to initiate the assisted interaction 166. Performing the assisted interaction 166 includes executing the step-workflow 161 associated with the user intent 160 of the calling user 110. Every step of the workflow 161 at least includes two or more response messages 164 including at least one voice prompt 164*a* to be transmitted using the telephone connection 136 and at least one deep link 164*b* of a respective UI screen 126 to be transmitted using the data connection 138 in conjunction with transmitting a voice prompt 164*a*. The voice prompt 164*a* to be transmitted in conjunction with the transmission of the deep link 164*b* includes instructions relating to one or more operations the user 110 is to perform on the UI screen 126 to which the deep link 164*b* belongs. At each step of the workflow 161, the transmission of a voice prompt 164*a* over the telephone connection 136 and a deep link 164*b* over the data connection 138 in conjunction with each other is triggered by receiving a respective pre-configured input message 162 from the user device 120.

By taking the user 110 to a particular UI screen 126 of the software application 124 and providing specific instructions to perform operations at the UI screen 126 at each step of the workflow 161, the interaction manager 150 essentially walk the user 110 through an assisted sequence of operations to perform the requested data interaction (e.g., block user membership). This significantly speeds up the performance of the data interaction as the user 110 no more needs to navigate through complex and inefficient menu structures associated with the IVR processor 140 and/or the software application 124. Walking the user 110 through only those UI screens 126 that are relevant to the data interaction being performed by the user 110 and by further providing instructions to complete operations on those UI screens 126 This saves computing resources at the IVR processor 140, the interaction manager 150, and at computing nodes (e.g., backend servers) that support the software application 124. The cumulative saving of computing resources at the IVR processor 140, the interaction manager 150 and at the computing nodes servicing the software application 124 over a plurality of data interactions performed by a plurality of users avoids computing resource overload at these systems, thus improving response times and failures of these computing systems.

In an example use case when the user intent 160 relates to blocking a user membership, a first step of the workflow 161 associated to this user intent 160 may include transmitting a deep link 164*b* of a UI screen 126 that presents membership numbers of a plurality of user memberships of the user 110 from which the user 110 can select a particular user membership that the user 110 desires to block. The first step of the workflow 161 may additionally include transmission of a voice prompt 164*a* including instructions that asks the user 110 to select a user membership from the list of user memberships presented on the UI screen 126 of the software application 124. For example, the voice prompt 164*a* may include "Please select the membership that you would like to block on your phone". The transmission of the deep link 164*b* and the voice prompt 164*a* associated with the first step of the workflow 161 in conjunction with each other is configured to be triggered by receiving the authorization information 130 and successful verification of the identity of the user 110. For example, in response to successfully verifying the identity of the user 110 based on the authorization information 130 received from the user 110, the interaction manager 150 may execute the first step of the workflow by transmitting to the user device 120 over the data connection 138 the deep link 164*b* of a UI screen 126 that includes a list of user memberships of the user 110 and forwarding the voice prompt 164*a* to the IVR processor 140 for transmission to the user device 120 over the telephone connection 136 in conjunction with the transmission of the deep link 164*b*. As described above, the voice prompt 164*a* includes an instruction that asks the user to select the user membership that the user 110 desires to block.

The deep link 164*b*, when received by the user device 120, may automatically open the particular UI screen 126 of the software application 124 that displays the list of user memberships relating to the user 110. In conjunction, the telephone application 122 may receive and play the voice prompt 164*a* asking the user to select the user membership that the user 110 desires to block. In response, the user 110 may select a desired user membership from the list of user memberships presented on the UI screen 126. This may trigger an input message 162 including the selection to be transmitted to the interaction manager 150 over the data connection 138.

The receipt of the input message 162 including the selection of a particular user membership may trigger a second step of the workflow 161. The second step of the workflow 161 may include transmitting a second deep link 164*b* of a UI screen 126 that presents one or more input fields where the user 110 may enter verification information (e.g., address, social security number etc.). The second step of the workflow 161 may additionally include transmission of a second voice prompt 164*a* including instructions that asks the user 110 to verification information on the UI screen 126 of the software application 124. For example, the second voice prompt 164*a* may include "Please enter verification information on your phone". The transmission of the second deep link 164*b* and the second voice prompt 164*a* associated with the second step of the workflow 161 in conjunction with each other is configured to be triggered by receiving the input message 162 including selection of the user membership. For example, in response to receiving the input message 162 including selection of the user membership, the interaction manager 150 may execute the second step of the workflow 161 by transmitting to the user device 120 over the data connection 138 the second deep link 164*b* of a UI screen 126 that includes input fields for providing verification information and forwarding the second voice prompt 164*a* to the IVR processor 140 for transmission to the user device 120 over the telephone connection 136 in conjunction with the transmission of the deep link 164*b*. As described above, the second voice prompt 164*a* includes instructions that asks the user to provide verification information on the phone.

The second deep link 164*b*, when received by the user device 120, may automatically open the particular UI screen 126 of the software application 124 that displays input fields for entering verification information (e.g., address, social security number etc.). In conjunction, the telephone application 122 may receive and play the second voice prompt 164*a* instructing the user to provide verification information on the phone. In response, the user 110 may enter verification information on the UI screen 126. This may trigger a second input message 162 including the verification information provided by the user 110, wherein the second input message 162 is transmitted to the interaction manager 150 over the data connection 138. In an additional or alternative embodiment, the user 110 may provide an input message 162 using a voice message 162*a*. For example, the user 110 may announce the verification information (e.g., address, social security number etc.). In this case, an input message 162 including the announcement of the user 110 (e.g., a voice file) is transmitted to the IVR processor 140 over the telephone connection 136. The IVR processor 140 forwards the input message 162 to the interaction manager 150 which may use natural language processing to interpret the voice message 162*a* and extract the verification information included in the voice message 162*a*.

Regardless of the channel (e.g., voice message and/or data over data connection) over which the second input message 162 is received from the user device 120, the receipt of the second input message 162 including the verification information provided by the user triggers a third step of the workflow 161. The third step of the workflow 161 may include transmitting a third deep link 164*b* of a UI screen 126 that displays a confirmation message when the verification information provided by the user 110 is successfully verified or transmitting a fourth deep link 164*b* of a UI screen 126 that displays an error message when the verification information provided by the user 110 cannot be verified. For example, the confirmation message may include confirming that the requested blocking of the selected user membership has been completed. On the other hand, the error message may include informing the user that the requested blocking of the selected user membership cannot be completed as the verification information provided by the user cannot be verified. The third step of the workflow 161 may additionally include transmission of a third voice prompt 164*a* that informs the user 110 that the requested blocking of the selected user membership has been completed or a fourth voice prompt 164*a* that informs the user 110 that the requested blocking cannot be completed. For example, the third voice prompt 164*a* may include "Your requested blocking of membership no. #### has been completed. Thanks for your call". The fourth voice prompt 164*a* may include "Your request cannot be completed. Please press 0 to speak to an agent". The transmission of the third deep link 164*b* and the third voice prompt 164*a* in conjunction with each other or the transmission of the fourth deep link 164*b* and the fourth voice prompt 164*a* in conjunction with each other is configured to be triggered by receiving the input message 162 including the verification information. For example, in response to receiving the input message 162 including the verification message, the interaction manager 150 verifies the verification message and executes the third step of the workflow 161 accordingly by transmitting to the user device 120 over the data connection 138 the third deep link 164*b* or the fourth deep link and forwarding the third voice prompt 164*a* or fourth voice prompt 164*a* respectively to the IVR processor 140 for transmission to the user device 120 over the telephone connection 136.

At this point, the assisted data interaction 166 is considered completed and the interaction manager 150 terminates the persistent data connection 138 with the user device. If the user 110 presses '0', the user 110 is transferred to a live agent. On the other hand, if the user hangs up or upon expiration of a pre-configured time period, the interaction manager 150 commands the IVR processor 140 to terminate the telephone connection 136 with the user device 120.

Figure 2:
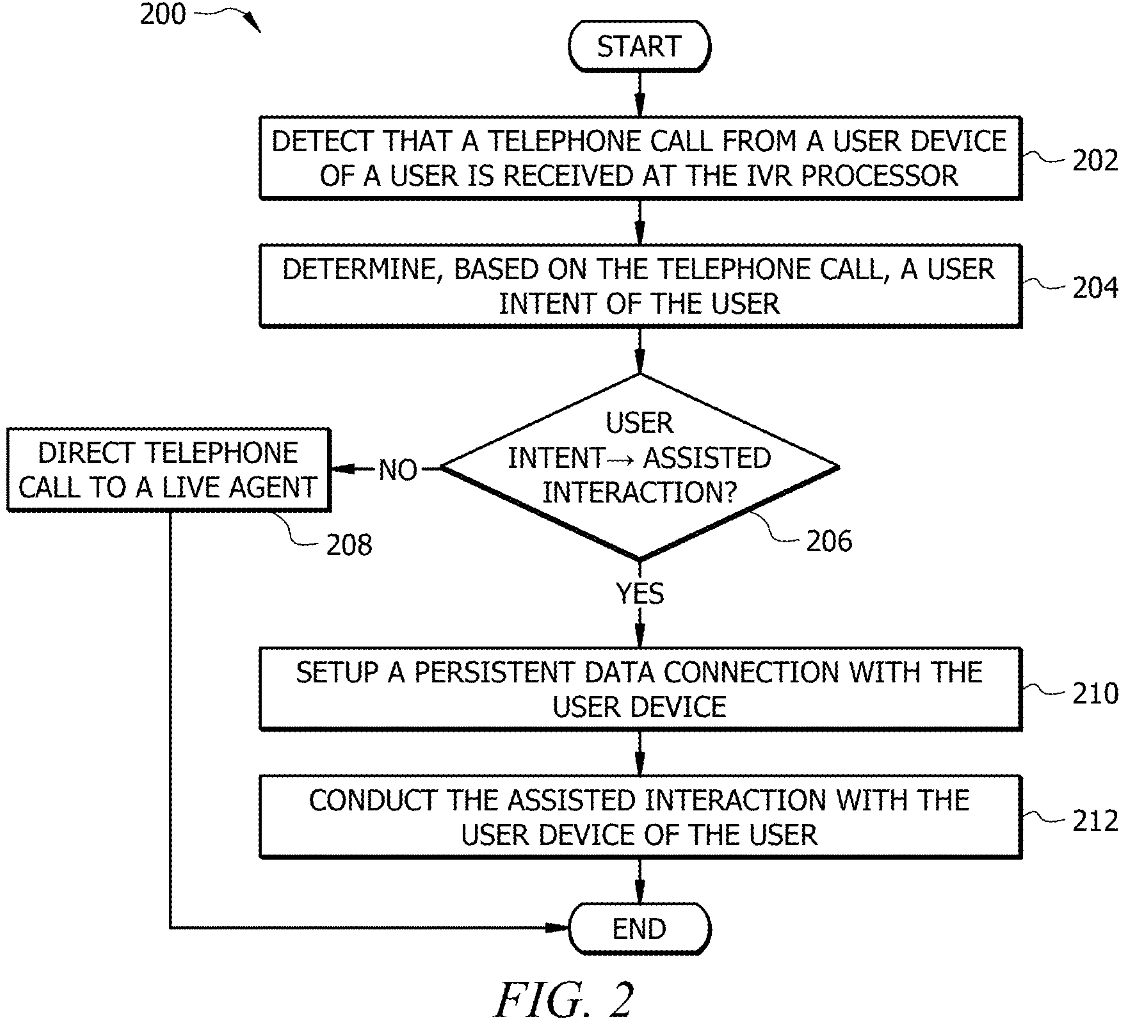
FIG. 2 illustrates a flowchart of an example method for performing an assisted interaction, in accordance with one or more embodiments of the present disclosure.

FIG. 2 illustrates a flowchart of an example method 200 for performing an assisted interaction 166, in accordance with one or more embodiments of the present disclosure. Method 200 may be performed by the interaction manager 150 shown in FIG. 1.

At operation 202, the interaction manager 150 detects that a telephone call 168 from a user device 120 of a user 110 is received at the IVR processor 140.

As described above, a user 110 desiring to perform a particular data interaction may use the telephone application 122 installed at a user device 120 of the user 110 to place a telephone call 168 to the IVR processor 140. The IVR processor 140 may receive the telephone call 168 and a telephone connection 136 is established between the IVR processor 140 and the user device 120.

At operation 204, the interaction manager 150 determines, based on the telephone call 168, a user intent 160 of the user 110.

As described above, in response to detecting that a telephone call 168 is received from the user device 120, the interaction manager 150 may be configured to command the IVR processor 140 to transmit a response message 164 to the user device 120 including a voice prompt 164*a* asking a user intent 160 of the user 110. In one embodiment, the interaction manager 150 may generate the voice prompt 164*a* and forward it to the IVR processor 140 for transmission to the user device 120. For example, the voice prompt 164*a* may include "Hello! How may I help you today". In one embodiment, the voice prompt 164*a* is transmitted to the user device 120 as a voice file (e.g., wav, mp3, mp4 etc.) that is played by the telephone application 122 at the user device 120. In response to receiving the voice prompt 164*a* from the IVR processor 140, the user 110 may provide an input message 162 including and/or indicating a user intent 160 of the user 110. In an example use case where the user 110 desires to temporarily block one of several memberships the user 110 has with an entity, the user 110 may provide an input message 162 in the form of a voice message 162*a* indicating the user intent 160. For example, the user 110 may announce "I would like to block a membership". Additionally, or alternatively, the user 110 may provide the input message 162 as DTMF tones 162*b*. For example, the voice prompt 164*a* transmitted by the IVR processor 140 may announce a menu with a plurality of menu options, wherein each menu option relates to a particular user intent 160 and is associated with a particular key. For example, the voice prompt 164*a* may announce "Please select from the following menu options-press 1 for viewing a membership, press 2 for blocking a membership, press 3 for updating information, or press 0 to speak to an agent". In response, the user 110 may press '2' on the keypad of the telephone application 122 to select the menu option "blocking a membership".

In response to receiving an input message 162 from the user device 120, the IVR processor 140 may be configured to forward the input message 162 to the interaction manager 150 which may be configured to interpret the input message 162 and determine one or more response messages 164 to be provided to the user device 120. For example, in response to receiving a voice message 162*a* (received at the IVR processor 140 from the user device 120) from the IVR processor 140, the interaction manager 150 may interpret the voice message 162*a* using natural language processing (NLP) to determine the user intent 160 of the user 110. Following the example use case introduced in the above paragraph, when the voice message 162*a* states "I would like to block a membership", the interaction manager 150 may use natural language processing to interpret the content of the voice message 162*a* and determine that the user intent 160 relates to temporarily blocking a user membership. In an alternative or additional embodiment, the IVR processor 140 may be configured to interpret the input message 162 received from the user device 120 and interpret the input message 162 to determine an intent of the user 110. For example, in response to receiving a DTMF tone 162*b* selecting a menu option associated with a particular user intent 160 (e.g., block a user membership), the IVR processor 140 may forward the user intent 160 associated with the selected menu option to the interaction manager 150.

At operation 206, the interaction manager 150 determines whether the user intent 160 of the user 110 is configured for an assisted interaction 166 using a telephone connection 136 to the user device 120 via the IVR processor 140 and a persistent data connection 138 to the user device 120, wherein the persistent data connection 138 is configured to exchange data (e.g., input messages 162 and response messages 164) with a software application 124 installed on the user device 120. In response to determining that the user intent 160 of the user 110 is not configured for assisted interaction 166, method 200 proceeds to operation 208 where the interaction manager 150 directs the telephone call 168 to a live agent. For example, the interaction manager 150 may cause the IVR processor 140 to transfer the telephone call 168 to a live agent. On the other hand, in response to determining that the user intent 160 of the user 110 is configured for an assisted interaction 166, method 200 proceeds to operation 210.

At operation 210, interaction manager 150 sets up a persistent data connection 138 with the user device 120 of the user 110 at least partially in response to determining that the user intent 160 of the user 110 is configured for the assisted interaction 166.

As described above, once the user intent 160 of the calling user 110 is determined, the interaction manager 150 may be configured to determine whether the user intent 160 is associated with a pre-configured workflow 161 of an assisted interaction 166 that can help the user 110 to perform the data interaction (e.g., block membership) relating to the determined user intent 160 of the user 110. In other words, the interaction manager 150 determines whether assisted interaction 166 may be used to help the user perform the data interaction (e.g., block membership) relating to the determined user intent 160 of the user 110. Once a preconfigured workflow 161 of an assisted interaction 166 associated to the determined user intent 160 is determined, the interaction manager 150 may be configured to initiate the assisted interaction 166 in accordance with the determined workflow 161. As part of initiating the assisted interaction 166 the interaction manager 150 establishes a persistent data connection 138 with the user device 120, wherein the persistent data connection 138 is configured to exchange data with the software application 124 at the user device 120. For example, the interaction manager 150 establishes a websocket with the user device 120. The term "websocket" refers to a communication protocol that allows a client (e.g., user device 120) and a server (e.g., interaction manager 150) to maintain a persistent, two-way connection. This connection enables real-time communication between the two endpoints, without the need to open multiple HTTP (Hypertext Transfer Protocol) connections. In one embodiment, once the persistent data connection 138 with the user device 120 is established, the interaction manager 150 maintains the data connection 138 along with the telephone connection 136 between the IVR processor 140 and the user device 120 for as long as the assisted interaction 166 is being performed.

At operation 212, interaction manager 150 conducts the assisted interaction 166 with the user device 120 by exchanging messages (e.g., input messages 162 and response messages 164) with the user device 120 via the IVR processor 140 over the telephone connection 136 and with the software application 124 installed on the user device 120 over the data connection 138.

As described above, performing the assisted interaction 166 includes executing the step-wise workflow 161 associated with the user intent 160 of the calling user 110. Every step of the workflow 161 at least includes two or more response messages 164 including at least one voice prompt 164*a* to be transmitted using the telephone connection 136 and at least one deep link 164*b* of a respective UI screen 126 to be transmitted using the data connection 138 in conjunction with transmitting a voice prompt 164*a*. The voice prompt 164*a* to be transmitted in conjunction with the transmission of the deep link 164*b* includes instructions relating to one or more operations the user 110 is to perform on the UI screen 126 to which the deep link 164*b* belongs. At each step of the workflow 161, the transmission of a voice prompt 164*a* over the telephone connection 136 and a deep link 164*b* over the data connection 138 in conjunction with each other is triggered by receiving a respective pre-configured input message 162 from the user device 120.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

an interactive voice response (IVR) processor configured to interact with a user via automated voice prompts over a telephone connection with a user device of the user; and a processor communicatively coupled to the IVR processor and configured to:

detect that a telephone call from a user device of the user is received at the IVR processor;

determine, based on the telephone call, an intent of the user;

determine that the intent of the user is configured for an assisted interaction using the telephone connection to the user device via the IVR processor and a persistent data connection to the user device, wherein the persistent data connection is configured to exchange data with a software application installed on the user device, wherein exchanging data with the software application over the persistent data connection comprises:

transmitting one or more deep links of user interface (UI) screens associated with the software application to cause the UI screens to open on a display of the user device; and receiving data provided by the user on the UI screens of the software application;

setup the persistent data connection with the user device of the user at least partially in response to determining that the intent of the user is configured for the assisted interaction; and conduct the assisted interaction with the user device by exchanging messages with the user device via the IVR processor over the telephone connection and with the software application installed on the user device over the data connection, wherein conducting the assisted interaction comprises:

receiving one or more input messages from the user device over the telephone connection, the data connection or a combination thereof;

determining, based on the one or more input messages, a first response message to be transmitted to the user device over the telephone connection and a second response message to be transmitted to the user device over the data connection; and transmitting the first response message to the user device over the telephone connection in conjunction with the second response message to the user device over the data connection.

2. The system of claim 1, wherein the processor is further configured to:

in response to detecting that the telephone call is received from the user device, cause the IVR processor to transmit to the user device over the telephone connection a first automated voice prompt asking the user to identify the intent of the user;

receive a first response message from the IVR processor, wherein the first response message is received at the IVR processor in response to the first automated voice prompt and comprises a voice message indicating the intent of the user; and interpret the voice message using natural language processing (NLP) to determine the intent of the user.

3. The system of claim 2, wherein the processor is further configured to:

in response to receiving the first response message, forward to the IVR processor a deep link to transmit to the user device over the telephone connection, wherein the deep link is associated with an authorization page of the software application installed on the user device, wherein:

selecting the deep link at the user device opens the authorization page on a display of the user device; and the authorization page allows the user to provide authorization information to prove an identity of the user.

4. The system of claim 3, wherein the processor is further configured to:

receive a second response message from the user device comprising the authorization information provided by the user using the authorization page;

verify the identity of the user based on the authorization information; and setup the persistent data connection with the user device of the user at least partially response to verifying the identity of the user.

5. The system of claim 1, wherein the processor conducts the assisted interaction by:

receiving one or more input messages from the user device comprising one or more of:

receiving a first input message over the telephone connection via the IVR processor; or receiving a second input message over the data connection from the software application;

determining, based on the one or more of the first input message or the second input message, one or more of:

a voice prompt to be transmitted over the telephone connection; or a deep link of a UI screen of the software application to be transmitted over the data connection, wherein the deep link displays the UI screen of the software application on a display of the user device; and performing one or more of:

forwarding the voice prompt to the IVR processor for transmission over the telephone connection to the user device; or transmitting the deep link of the UI screen of the software application over the data connection to the user device.

6. The system of claim 1, wherein the processor is configured to maintain both the telephone connection and the data connection with the user until completion of the assisted interaction.

7. The system of claim 1, wherein the persistent data connection comprises a websocket.

8. A method comprising:

detect that a telephone call from a user device of the user is received at an IVR processor configured to interact with the user via automated voice prompts over a telephone connection with the user device of the user;

determine, based on the telephone call, an intent of the user;

determine that the intent of the user is configured for an assisted interaction using the telephone connection to the user device via the IVR processor and a persistent data connection to the user device, wherein the persistent data connection is configured to exchange data with a software application installed on the user device, wherein exchanging data with the software application over the persistent data connection comprises:

transmitting one or more deep links of user interface (UI) screens associated with the software application to cause the UI screens to open on a display of the user device; and receiving data provided by the user on the UI screens of the software application;

setup the persistent data connection with the user device of the user at least partially in response to determining that the intent of the user is configured for the assisted interaction; and conduct the assisted interaction with the user device by exchanging messages with the user device via the IVR processor over the telephone connection and with the software application installed on the user device over the data connection, wherein conducting the assisted interaction comprises:

receiving one or more input messages from the user device over the telephone connection, the data connection or a combination thereof;

determining, based on the one or more input messages, a first response message to be transmitted to the user device over the telephone connection and a second response message to be transmitted to the user device over the data connection; and transmitting the first response message to the user device over the telephone connection in conjunction with the second response message to the user device over the data connection.

9. The method of claim 8, further comprising:

in response to detecting that the telephone call is received from the user device, cause the IVR processor to transmit to the user device over the telephone connection a first automated voice prompt asking the user to identify the intent of the user;

receive a first response message from the IVR processor, wherein the first response message is received at the IVR processor in response to the first automated voice prompt and comprises a voice message indicating the intent of the user; and interpret the voice message using natural language processing (NLP) to determine the intent of the user.

10. The method of claim 9, further comprising:

in response to receiving the first response message, forward to the IVR processor a deep link to transmit to the user device over the telephone connection, wherein the deep link is associated with an authorization page of the software application installed on the user device, wherein:

selecting the deep link at the user device opens the authorization page on a display of the user device; and the authorization page allows the user to provide authorization information to prove an identity of the user.

11. The method of claim 10, further comprising:

receive a second response message from the user device comprising the authorization information provided by the user using the authorization page;

verify the identity of the user based on the authorization information; and setup the persistent data connection with the user device of the user at least partially response to verifying the identity of the user.

12. The method of claim 8, wherein conducting the assisted interaction comprises:

receiving one or more input messages from the user device comprising one or more of:

receiving a first input message over the telephone connection via the IVR processor; or receiving a second input message over the data connection from the software application;

determining, based on the one or more of the first input message or the second input message, one or more of:

a voice prompt to be transmitted over the telephone connection; or a deep link of a UI screen of the software application to be transmitted over the data connection, wherein the deep link displays the UI screen of the software application on a display of the user device; and performing one or more of:

forwarding the voice prompt to the IVR processor for transmission over the telephone connection to the user device; or transmitting the deep link of the UI screen of the software application over the data connection to the user device.

13. The method of claim 8, further comprising maintaining both the telephone connection and the data connection with the user until completion of the assisted interaction.

14. The method of claim 8, wherein the persistent data connection comprises a websocket.

15. A non-transitory computer-readable medium storing instructions that when executed by a processor causes the processor to:

detect that a telephone call from a user device of the user is received at an IVR processor configured to interact with the user via automated voice prompts over a telephone connection with the user device of the user;

determine, based on the telephone call, an intent of the user;

determine that the intent of the user is configured for an assisted interaction using the telephone connection to the user device via the IVR processor and a persistent data connection to the user device, wherein the persistent data connection is configured to exchange data with a software application installed on the user device, wherein exchanging data with the software application over the persistent data connection comprises:

transmitting one or more deep links of user interface (UI) screens associated with the software application to cause the UI screens to open on a display of the user device; and receiving data provided by the user on the UI screens of the software application;

setup the persistent data connection with the user device of the user at least partially in response to determining that the intent of the user is configured for the assisted interaction; and conduct the assisted interaction with the user device by exchanging messages with the user device via the IVR processor over the telephone connection and with the software application installed on the user device over the data connection, wherein conducting the assisted interaction comprises:

receiving one or more input messages from the user device over the telephone connection, the data connection or a combination thereof;

determining, based on the one or more input messages, a first response message to be transmitted to the user device over the telephone connection and a second response message to be transmitted to the user device over the data connection; and transmitting the first response message to the user device over the telephone connection in conjunction with the second response message to the user device over the data connection.

16. The non-transitory computer-readable medium of claim 15, wherein the instructions further cause the processor to:

in response to detecting that the telephone call is received from the user device, cause the IVR processor to transmit to the user device over the telephone connection a first automated voice prompt asking the user to identify the intent of the user;

receive a first response message from the IVR processor, wherein the first response message is received at the IVR processor in response to the first automated voice prompt and comprises a voice message indicating the intent of the user; and interpret the voice message using natural language processing (NLP) to determine the intent of the user.

17. The non-transitory computer-readable medium of claim 16, wherein the instructions further cause the processor to:

in response to receiving the first response message, forward to the IVR processor a deep link to transmit to the user device over the telephone connection, wherein the deep link is associated with an authorization page of the software application installed on the user device, wherein:

selecting the deep link at the user device opens the authorization page on a display of the user device; and the authorization page allows the user to provide authorization information to prove an identity of the user.

18. The non-transitory computer-readable medium of claim 17, wherein the instructions further cause the processor to:

receive a second response message from the user device comprising the authorization information provided by the user using the authorization page;

verify the identity of the user based on the authorization information; and setup the persistent data connection with the user device of the user at least partially response to verifying the identity of the user.

19. The non-transitory computer-readable medium of claim 15, wherein conducting the assisted interaction comprises:

receiving one or more input messages from the user device comprising one or more of:

receiving a first input message over the telephone connection via the IVR processor; or receiving a second input message over the data connection from the software application;

determining, based on the one or more of the first input message or the second input message, one or more of:

a voice prompt to be transmitted over the telephone connection; or a deep link of a UI screen of the software application to be transmitted over the data connection, wherein the deep link displays the UI screen of the software application on a display of the user device; and performing one or more of:

forwarding the voice prompt to the IVR processor for transmission over the telephone connection to the user device; or transmitting the deep link of the UI screen of the software application over the data connection to the user device.

20. The non-transitory computer-readable medium of claim 15, wherein the instructions further cause the processor to maintain both the telephone connection and the data connection with the user until completion of the assisted interaction.

* * * * *